(12) United States Patent
Kiyoshita et al.

(10) Patent No.: US 11,173,961 B2
(45) Date of Patent: Nov. 16, 2021

(54) VEHICLE REAR BODY STRUCTURE

(71) Applicant: Mazda Motor Corporation, Hiroshima (JP)

(72) Inventors: Daisuke Kiyoshita, Hiroshima (JP); Takeshi Nakamura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 104 days.

(21) Appl. No.: 16/789,430

(22) Filed: Feb. 13, 2020

(65) Prior Publication Data

US 2020/0269926 A1 Aug. 27, 2020

(30) Foreign Application Priority Data

Feb. 21, 2019 (JP) .............................. JP2019-029371

(51) Int. Cl.
| | |
|---|---|
| *B60J 7/00* | (2006.01) |
| *B62D 25/08* | (2006.01) |
| *B62D 21/02* | (2006.01) |
| *B62D 21/08* | (2006.01) |
| *B62D 25/02* | (2006.01) |
| *B62D 25/06* | (2006.01) |
| *B62D 25/20* | (2006.01) |
| *B62D 27/02* | (2006.01) |

(52) U.S. Cl.
CPC .............. *B62D 25/08* (2013.01); *B62D 21/02* (2013.01); *B62D 21/08* (2013.01); *B62D 25/025* (2013.01); *B62D 25/06* (2013.01); *B62D 25/2027* (2013.01); *B62D 27/02* (2013.01)

(58) Field of Classification Search
CPC .... B60J 7/1291; B62D 25/06; B60C 23/0418; B60C 23/044; B60C 23/0442; H01L 2924/00014; H01L 2924/00; H01L 2224/32225; H01L 2224/45144; H01L 2224/48227
See application file for complete search history.

(56) References Cited

U.S. PATENT DOCUMENTS

| | | | |
|---|---|---|---|
| 2020/0269922 A1* | 8/2020 | Kiyoshita | .............. B62D 21/11 |
| 2020/0398901 A1* | 12/2020 | Kiyoshita | .............. B62D 25/02 |
| 2021/0086833 A1* | 3/2021 | Sato | ..................... B62D 25/088 |

FOREIGN PATENT DOCUMENTS

JP 2014-19219 A 2/2014

* cited by examiner

*Primary Examiner* — Kiran B Patel
(74) *Attorney, Agent, or Firm* — Xsensus LLP

(57) ABSTRACT

The present disclosure relates to a vehicle rear body structure in which a meeting section is constructed at an upper corner of a rear gate opening that is opened rearward in a body rear portion, and in the meeting section, a roof side rail that extends in a vehicle longitudinal direction in a body side portion and a rear header that extends in a vehicle width direction in the body rear portion meet. The vehicle rear body structure that improves rigidity of the body rear portion while suppressing relative displacement between the rear header and the roof side rail.

20 Claims, 7 Drawing Sheets

VEHICLE REAR BODY STRUCTURE

CROSS-REFERENCE TO RELATED APPLICATION

The present application claims priority to JP 2019-029371, filed Feb. 21, 2019, the entire contents of which are incorporated herein by reference.

TECHNICAL FIELD

The present disclosure relates to a vehicle rear body structure in which a meeting section is constructed at an upper corner of a rear gate opening that is opened rearward in a body rear portion, and in the meeting section, a roof side rail that extends in a vehicle longitudinal direction in a body side portion and a rear header that extends in a vehicle width direction in the body rear portion meet.

BACKGROUND

Body types such as a minivan, a station wagon, and a hatchback, each of which includes a rear gate opening at a rear end of a body rear portion, are available for vehicles. The rear gate opening is opened rearward from a rear section that is provided in the body rear portion. The rear gate opening is opened and closed by an openable rear gate. For example, the rear gate of a flip-open type that is pivoted to an upper edge of the rear gate opening on the body side via a hinge is known.

In general, the rear gate is larger than a side door and the like, and includes a rear window glass. Various components such as a rear windshield wiper drive mechanism, a rear combination lamp unit, and a latch unit are mounted on the rear gate. Thus, the rear gate tends to have relatively heavy weight. For this reason, when the vehicle travels (especially when the vehicle accelerates or decelerates), it is necessary to reinforce a portion around the rear gate opening from perspectives of preventing vibrations of the rear gate and preventing twisting of the body rear portion.

For example, a rear body structure in Patent document 1 includes an extending section, which extends outward in a vehicle width direction, at an outer end in the vehicle width direction of the rear header located at the upper edge of the rear gate opening, and is provided with plural beads, each of which extends in the vehicle width direction, on an upper surface of the extending section. In this way, of the portion around the rear gate opening, particularly, the outer end in the vehicle width direction of the rear header is reinforced, so as to increase rigidity of the body rear portion.

However, in the case where the rear header is reinforced locally, a difference in the rigidity between the rear header and a roof side rail, a rear end of which is joined to the outer end in the vehicle width direction of the rear header, that is, in a meeting section of the rear header and the roof side rail occurs, which brings a concern of facilitating relative displacement between the rear header and the roof side rail in the meeting section.

PRIOR ART DOCUMENTS

Patent Documents

[Patent document 1] JP-A-2014-19219

SUMMARY

In view of the above, the present inventors discovered a vehicle rear body structure capable of improving rigidity of a body rear portion while suppressing relative displacement between a rear header and a roof side rail.

The present disclosure is directed to a vehicle rear body structure including: a rear header that extends in a vehicle width direction along an upper edge of a rear gate opening opened rearward in a vehicle; and a roof side rail that extends in a vehicle longitudinal direction in a body side portion, and constituting a meeting section where an outer end in the vehicle width direction of the rear header and a rear end of the roof side rail meet in a body rear portion. The meeting section is provided with a reinforcing member (a reinforcement) that is integrally formed with a rail extension section that extends to the roof side rail and a header extension section that extends to the rear header. Plural closed cross sections, each of which extends along the vehicle width direction, are formed adjacently in the vehicle longitudinal direction between a rear header outer provided in the rear header and at least the header extension section of the reinforcing member. A relative displacement suppressing section that suppresses relative displacement between the rear header and the roof side rail is provided between the rail extension section and the header extension section.

According to the above configuration, in order to reinforce an upper portion of the rear gate opening, it is possible to suppress the relative displacement between the rear header and the roof side rail, which is caused by a rigidity difference therebetween and is concerned when plural closed cross sections are formed in the rear header.

That is, in the case where the plural closed cross sections are formed in the rear header, rigidity of an upper portion of a rear gate is increased. Meanwhile, since the roof side rail is a structure that is formed relatively long in a longitudinal direction, serious distortion tends to concentrate in a joined region (a crossed region) between such members with the large rigidity difference. Thus, the relative displacement between the rear header and the roof side rail tends to occur. However, with the above configuration, such relative displacement can be suppressed.

As an aspect of the present disclosure, in the meeting section of the rear header and the roof side rail, the relative displacement suppressing section is hung between these rear header and roof side rail, and the header extension section extends from the meeting section to at least a rear gate hinge fixing section or a position nearby in the vehicle width direction of the rear header.

According to the above configuration, it is possible to improve a vibration suppression effect of the body rear portion against displacement of the rear gate during travel of the vehicle.

That is, the rear header receives a vibration generated by a vibration of the rear gate during the travel of the vehicle. However, since the relative displacement suppressing section extends to the rear gate hinge fixing section or the position nearby, it is possible to suppress the vibration.

As an aspect of the present invention, a rear pillar that extends along a side edge of the rear gate opening meets the meeting section, the reinforcing member is integrally formed with a pillar extension section that extends from the meeting section to the rear pillar, and a closed cross section that extends along the side edge of the rear gate opening is formed between a rear pillar outer provided in the rear pillar and at least the pillar extension section of the reinforcing member.

According to the above configuration, the meeting section located at an upper corner of the rear gate opening is reinforced by the reinforcing member, which is integrally formed with the pillar extension section, the rail extension section, and a rear pillar extending section and forms the closed cross section with each outer panel of the rear header, the roof side rail, and the rear pillar. In this way, it is possible to further improve the vibration suppression effect of the body rear portion against the displacement of the rear gate during the travel of the vehicle.

According to the present disclosure, it is possible to improve rigidity of the body rear portion by suppressing the relative displacement between the rear header and the roof side rail.

DETAILED DESCRIPTION

Figure 1:
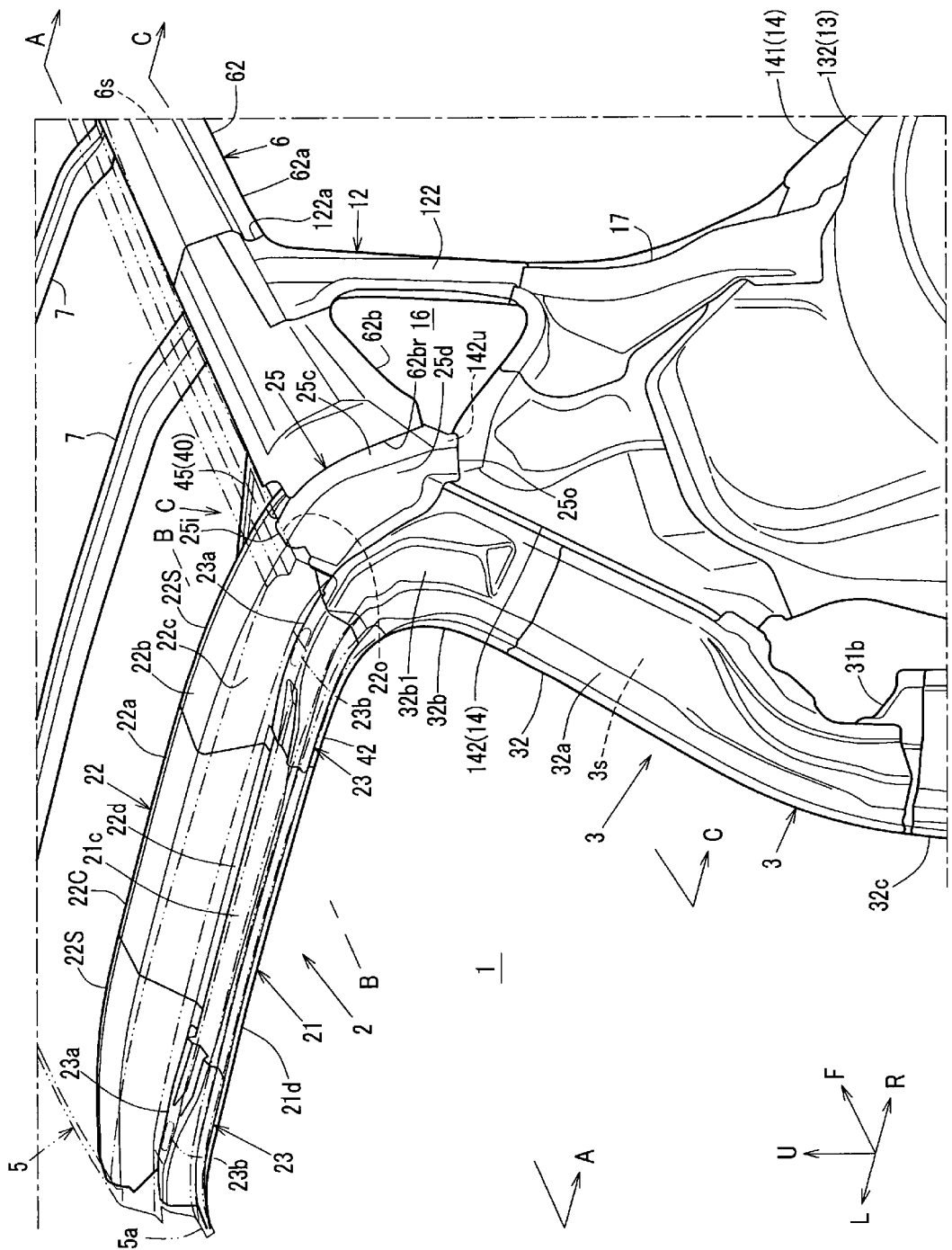
FIG. 1 is a perspective view in which a main section of a vehicle body rear structure according to an embodiment is seen from the rear and obliquely downward from the right.

A detailed description will hereinafter be made on an embodiment of the present disclosure with reference to the drawings.

In the drawings, an arrow F indicates a front direction of a vehicle, an arrow R indicates a right direction of the vehicle, an arrow L indicates a left direction of the vehicle, and an arrow U indicates an up direction of the vehicle. A vehicle rear body structure in this embodiment is substantially and bilaterally symmetrical. Thus, a description will be centered on a configuration on a right side of the vehicle unless otherwise particularly noted. In the drawings, an outer panel as a body outer plate is not illustrated unless otherwise particularly noted. In addition, in the following description, a reinforcement will be abbreviated as a rein.

Figure 2:
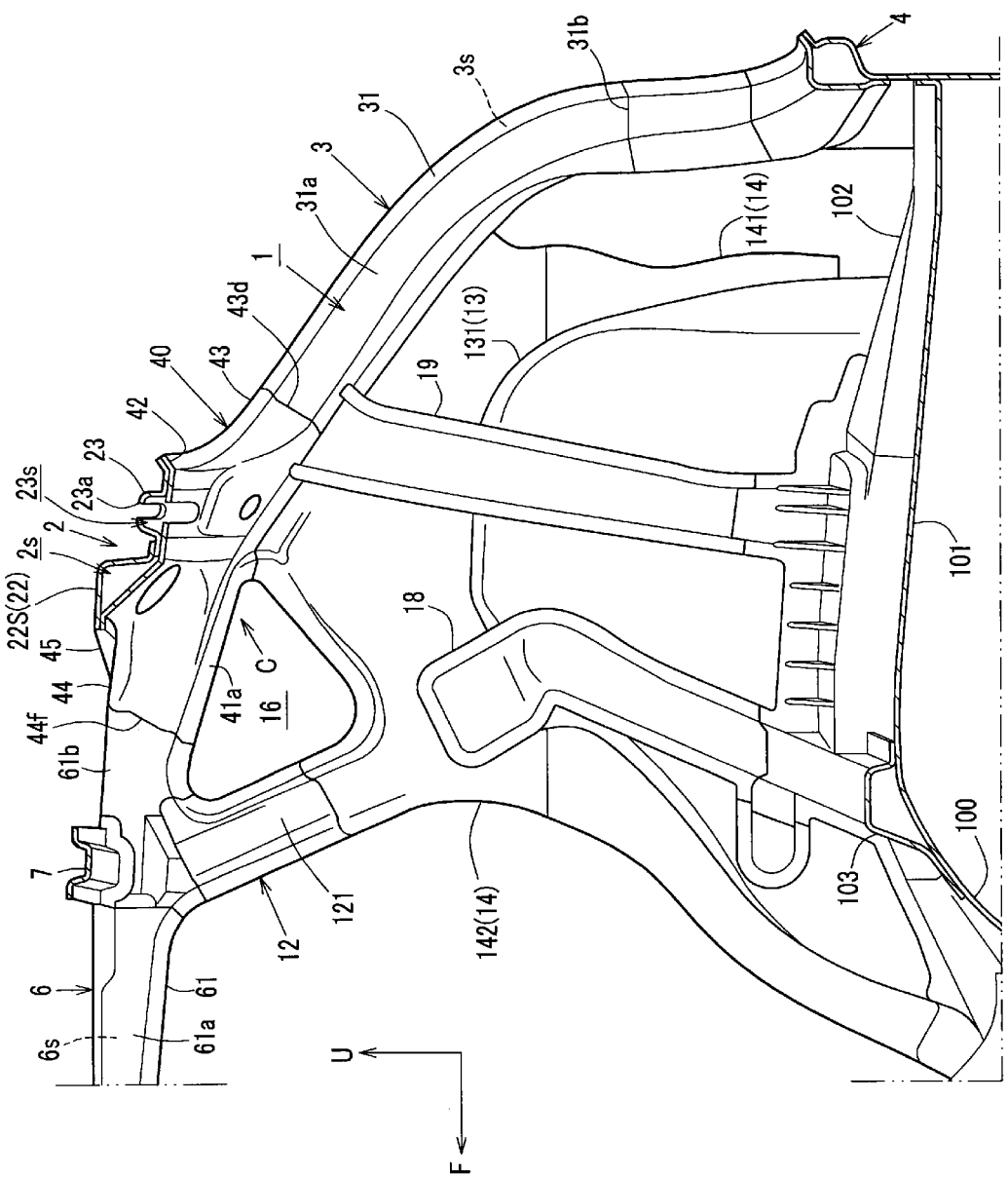
FIG. 2 is a cross-sectional view seen in an arrow direction of A-A in FIG. 1.

FIG. 1 is a perspective view in which a main section of the vehicle rear body structure according to this embodiment is seen from the rear and obliquely downward from the right. FIG. 2 is a cross-sectional view seen in an arrow direction of A-A in FIG. 1.

As illustrated in FIG. 1 and FIG. 2, the vehicle in this embodiment is an automobile of a door hatchback type, and includes a rear gate opening 1, which is opened rearward from a trunk as a rear section provided in a body rear portion, in the body rear portion. The rear gate opening 1 includes a rear gate of a flip-open type (not illustrated).

In a rear portion of the vehicle, a rear header 2 that extends in a vehicle width direction along an upper edge of the rear gate opening 1, a rear pillar 3 that extends downward and rearward along each of right and left edges of the rear gate opening 1, and a rear end member 4 (see FIG. 2) that extends in the vehicle width direction along a lower edge of the rear gate opening 1 are provided. These components constitute a peripheral edge of the rear gate opening 1.

In an upper portion of the vehicle in this embodiment, a roof panel 5, a roof side rail 6 that extends along a vehicle longitudinal direction on each side of the roof panel 5, the rear header 2, and plural roof reins 7 that are provided across the roof side rails 6 on both of the sides in a manner to separate from each other in the vehicle longitudinal direction are provided. The roof panel 5 is disposed to cover a cabin, including the rear header 2, from the above. In this way, a rear portion of the roof panel 5 also serves as an outer panel of the rear header 2.

As illustrated in FIG. 1 and FIG. 2, in a side portion of the vehicle rear portion, the rear pillar 3, an intermediate pillar 12, a wheel house 13, and a side inner panel 14 are provided. The intermediate pillar 12, a rear portion of the roof side rail 6, and a front edge upper portion of the side inner panel 14 constitute an opening 16 for a quarter window.

The intermediate pillar 12 corresponds to a front side of the opening 16 for the quarter window, and includes an intermediate pillar rein 122 and an intermediate pillar inner 121. At an upper end of the intermediate pillar rein 122, an upper end flange 122a that is projected upward to the rear portion of the roof side rail 6 is provided, and is joined to the rear portion of the roof side rail 6 (a roof side rail rein rear section 62b, which will be described below) by spot welding or the like.

The wheel house 13 is formed in an arch shape that can accommodate a rear wheel and is projected upward in a vehicle side view. The wheel house 13 includes: a wheel house inner 131 that is bulged inward in the vehicle width direction; and a wheel house outer 132 that is bulged outward in the vehicle width direction.

The side inner panel 14 is a panel that forms a cabin side wall, and is disposed such that a lower portion thereof is held between the wheel house inner 131 and the wheel house outer 132. The side inner panel 14 includes a side inner panel lower 141 and a side inner panel upper 142. The side inner panel lower 141 is mainly disposed on each of front and rear sides of the wheel house 13, and the side inner panel upper 142 is disposed in a region mainly from upper ends of the side inner panel lower 141 and the wheel house 13 to the rear pillar 3 and the opening 16 for the quarter window.

As illustrated in FIG. 1, in an outer side in the vehicle width direction of the side portion of the vehicle rear portion, a wheel house outer rein 17 that extends in an up-down direction in a corner section between the side inner panel upper 142 and the wheel house outer 132 and couples these is provided. The wheel house outer rein 17 is formed in a hat shape in which a horizontal cross section is opened inward in the vehicle width direction, and an upper portion thereof is coupled to a lower portion of the intermediate pillar rein 122.

As illustrated in FIG. 2, side braces 18 and 19, which extend in the up-down direction on the front and rear sides, are provided on an inner side in the vehicle width direction of the side portion of the vehicle rear portion. Each of these side braces 18 and 19 on the front and rear sides has the hat shape in which a horizontal cross section is opened outward in the vehicle width direction.

Here, in a lower portion of the body rear portion, a rear seat pan 100, on which rear seats (not illustrated) are placed, and a rear floor 101 for forming the trunk are provided. On both sides of these rear seat pan 100 and the rear floor 101, rear side frames 102, each of which extends in the vehicle longitudinal direction, are provided. In addition, on a boundary section between these rear seat pan 100 and rear floor 101, a crossmember 103 that extends in the vehicle width direction is provided.

The front side brace 18 extends from an outer end in the vehicle width direction of the crossmember 103 to the side inner panel upper 142 located near a substantially lower end of the intermediate pillar 12 in a manner to extend beyond the wheel house inner 131.

The rear side brace 19 extends from the rear side frame 102 to a lower edge of the upper portion of the rear pillar 3 in a manner to extend beyond the wheel house inner 131 and the side inner panel upper 142.

Figure 3:
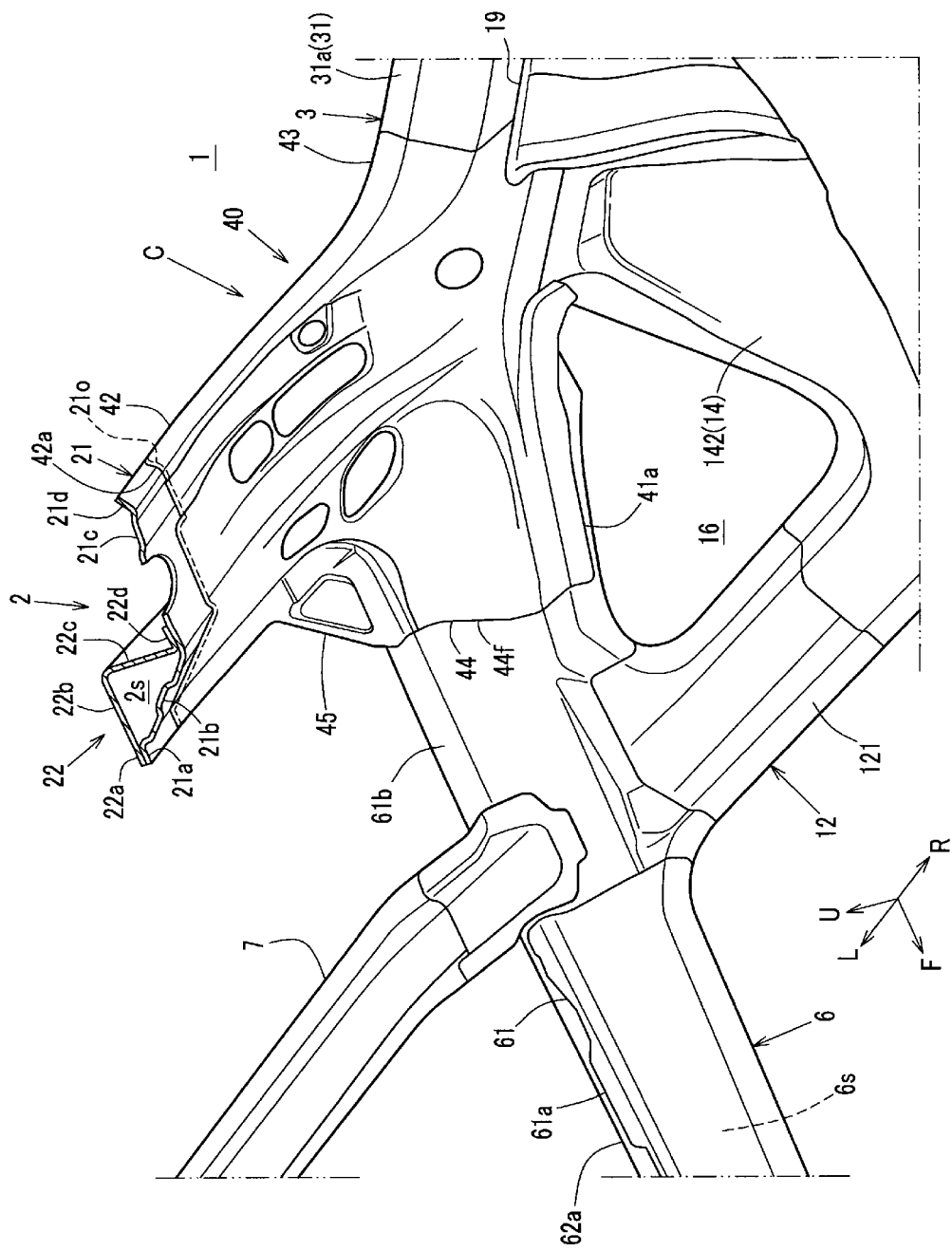
FIG. 3 is an enlarged view of a main section in which a meeting section and a portion therearound are seen from a cabin side and which is illustrated in a partial cross section.
Figure 4:
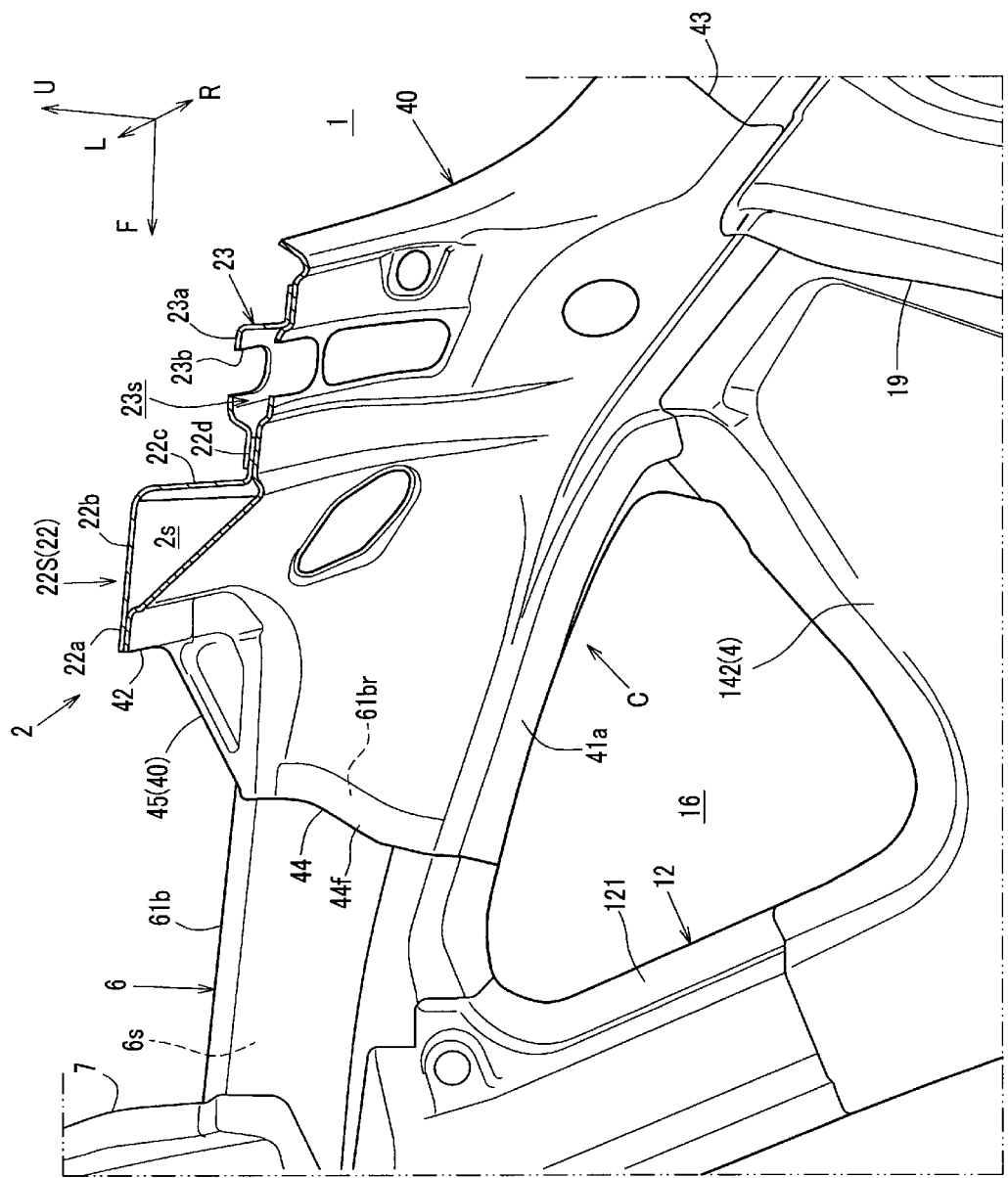
FIG. 4 is an enlarged view of the meeting section and the portion therearound in FIG. 2.

FIG. 3 is an enlarged view of a main section in which a meeting section C and a portion therearound are seen from a cabin side and which is illustrated in a partial cross section. FIG. 4 is an enlarged view of the meeting section C and the portion therearound in FIG. 2. The rear header 2 in FIG. 3 is cut by line B-B in FIG. 1.

As illustrated in FIG. 1 to FIG. 4, in the body rear portion, the meeting section C (a joined section) where an outer end in the vehicle width direction of the rear header 2, a rear end of the roof side rail 6, and an upper front end of the rear pillar 3 meet is constructed.

In other words, at an upper corner (a corner section between the upper edge and a side edge) of the rear gate opening 1 in the body rear portion, the meeting section C where the rear header 2, the roof side rail 6, and the rear pillar 3 meet is constructed.

A detailed description will hereinafter be made on these rear header 2, roof side rail 6, and rear pillar 3 as well as on the meeting section C.

As illustrated in the same drawings, the rear header 2 extends in the vehicle width direction in the body rear portion and includes a rear header inner 21 located below (on a body inner side), a rear header rein 22 located above (on a body outer side), a hinge rein 23, and a header extension section 42 (see FIG. 2 to FIG. 4).

As illustrated in FIG. 3, the rear header inner 21 extends in the vehicle width direction at the upper edge of the rear gate opening 1, has: a front end flange 21a that extends substantially horizontally; a vertical wall 21b that extends obliquely downward to the rear from a rear end of the front end flange 21a; a lower wall 21c that extends substantially horizontally from a lower end of the vertical wall 21b to the rear; and a rear end flange 21d that extends upward from a rear end of the lower wall 21c, and is formed in a step shape when viewed perpendicularly to the vehicle width direction. Here, a rear end flange 5a that is provided at a rear end of the roof panel 5 is joined to the rear end flange 21d of the rear header inner 21 by the spot welding or the like (see FIG. 1).

As will be described later, the header extension section 42 provided in a reinforcing member 40 is disposed in an upper corner section of the rear gate opening 1, and an inner end in the vehicle width direction of this header extension section 42 is connected to an outer end in the vehicle width direction of the rear header inner 21 (see FIG. 3).

The rear header rein 22 extends almost all over the upper edge of the rear gate opening 1 in the vehicle width direction and, as illustrated in FIG. 3 and FIG. 4, has: a front end flange 22a that extends substantially horizontally; an upper wall 22b that extends substantially horizontally from a rear end of the front end flange 22a to the rear; a vertical wall 22c that extends downward from a rear end of the upper wall 22b; and a rear end flange 22d that extends substantially horizontally from a lower end of the vertical wall 22c to the rear, so as to form a step-shaped (crank-shaped) cross section that is orthogonal to the vehicle width direction. In this example, in the rear header rein 22, a rear header rein center 22C and rear header rein sides 22S located on both of right and left sides of the rear header rein center 22C are integrally coupled to each other in the vehicle width direction (see FIG. 1).

Then, the front end flanges 21a and 22a of the rear header inner 21 and the rear header rein 22 are joined by the spot welding or the like, and a front end position of the lower wall 21c of the rear header inner 21 and the rear end flange 22d of the rear header rein 22 are joined by the spot welding or the like. In this way, a front portion (a portion substantially corresponding to a front half in this example) of the rear header 2 forms a closed cross section 2s, which extends in the vehicle width direction, between the rear header inner 21 and the rear header rein 22 located above.

As illustrated in FIG. 1, the hinge rein 23 is a portion corresponding to the header extension section 42, which is provided on the outer side of the rear header inner 21 in the vehicle width direction of the rear header 2, and is disposed in a portion corresponding to a portion on the rear side of the rear header rein 22.

Furthermore, as illustrated in FIG. 1, FIG. 2, and FIG. 4, in the cross section orthogonal to the vehicle width direction, the hinge rein 23 is formed in a hat shape and has a raised section 23a that is raised upward. This raised section 23a is formed in a bead shape that extends in the vehicle width direction (see FIG. 1), and is formed such that the inside thereof is opened downward (see FIG. 2 and FIG. 3). In addition, the raised section 23a is disposed next to the rear header rein 22 while separating rearward from the rear header rein 22 (see FIG. 2 and FIG. 3).

In this way, as illustrated in FIG. 1, the rear header rein 22 and the raised section 23a are disposed substantially parallel to each other in a manner to be aligned adjacently in the longitudinal direction. An upper surface of the raised section 23a of the hinge rein 23 is formed with a hinge fixing section 23b where a rear gate hinge (not illustrated) for pivotally supporting an upper end of the rear gate is fastened and fixed by a bolt or the like.

As illustrated in FIG. 2, in the body rear portion, the rear pillar 3 extends in the vehicle longitudinal direction (the up-down direction), and includes: a rear pillar inner 31 located below (the body inner side); a pillar extension section 43; and a rear pillar rein 32, as illustrated in FIG. 1, located above (the body outer side of) these. These components form a closed cross section 3s (see FIG. 5 and FIG. 6) that extends along an extending direction of the rear pillar 3.

As illustrated in FIG. 2, the rear pillar inner 31 includes: a rear pillar inner main section 31a; and a rear pillar inner lower section 31b that extends downward (rearward) from a lower (rear) end of the rear pillar inner main section 31a.

As will be described later, in the upper corner section of the rear gate opening 1, the pillar extension section 43 provided in the reinforcing member 40 is disposed. A lower end of this pillar extension section 43 is connected to an upper end of the rear pillar inner main section 31a (see FIG. 2).

As illustrated in FIG. 1, the rear pillar rein 32 includes: a rear pillar rein main section 32a; a rear pillar rein upper section 32b that extends upward (forward) from an upper (front) end of the rear pillar rein main section 32a; and a rear pillar rein lower section 32c that extends downward (rearward) from an lower (rear) end of the rear pillar rein main section 32a.

The rear pillar rein upper section 32b is formed in a curved shape such that a front portion (an upper portion) is curved inward in the vehicle width direction in a manner to correspond to a curved shape of the upper corner section (an inner edge shape of the corner section) of the rear gate opening 1. In addition, in an intermediate portion in a width direction of the rear pillar rein upper section 32b, a raised section 32b1 that is raised upward with respect to a portion therearound is formed. In an extending direction of the rear pillar rein upper section 32b, this raised section 32b1 extends in a bead shape for the entire rear pillar rein upper section 32b except for a rear portion, and has an inner space 3s' therein (see FIG. 5 and FIG. 6) that is opened downward.

As illustrated in FIG. 1 and FIG. 2, the roof side rail 6 extends in the vehicle longitudinal direction in the body side portion, and includes: a roof side rail inner 61 and a rail extension section 44 located inward (on the body inner side) in the vehicle width direction; and a roof side rail rein 62 located outward (on the body outer side) of these in the vehicle width direction. These components form a closed cross section 6s (see FIG. 5 and FIG. 6) that extends along an extending direction of the roof side rail 6.

As illustrated in FIG. 2, the roof side rail inner 61 includes a roof side rail inner main section 61a and a roof side rail inner rear section 61b that extends rearward from a rear end of the roof side rail inner main section 61a.

As will be described later, in the upper corner section of the rear gate opening 1, the rail extension section 44 provided in the reinforcing member 40 is disposed. A front end of this rail extension section 44 is connected to a rear end of the roof side rail inner rear section 61b (see FIG. 2).

As illustrated in FIG. 1, the roof side rail rein 62 includes a roof side rail rein main section 62a and the roof side rail rein rear section 62b that extends rearward from the rear end of the roof side rail inner main section 61a.

Figure 5:
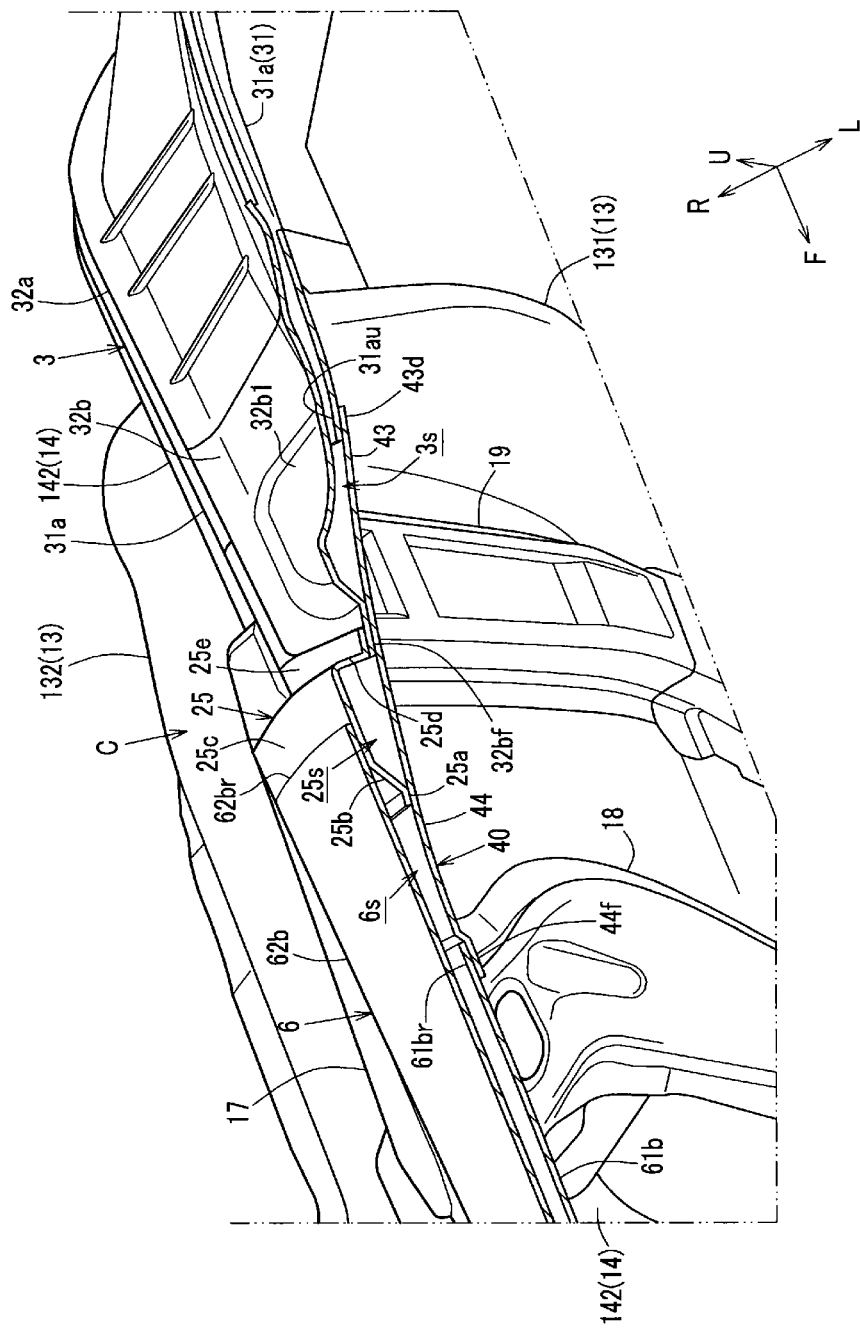
FIG. 5 is a perspective cross-sectional view in which the main section of the vehicle body rear structure is seen from above and front with respect to an arrow direction of C-C in FIG. 1.
Figure 6:
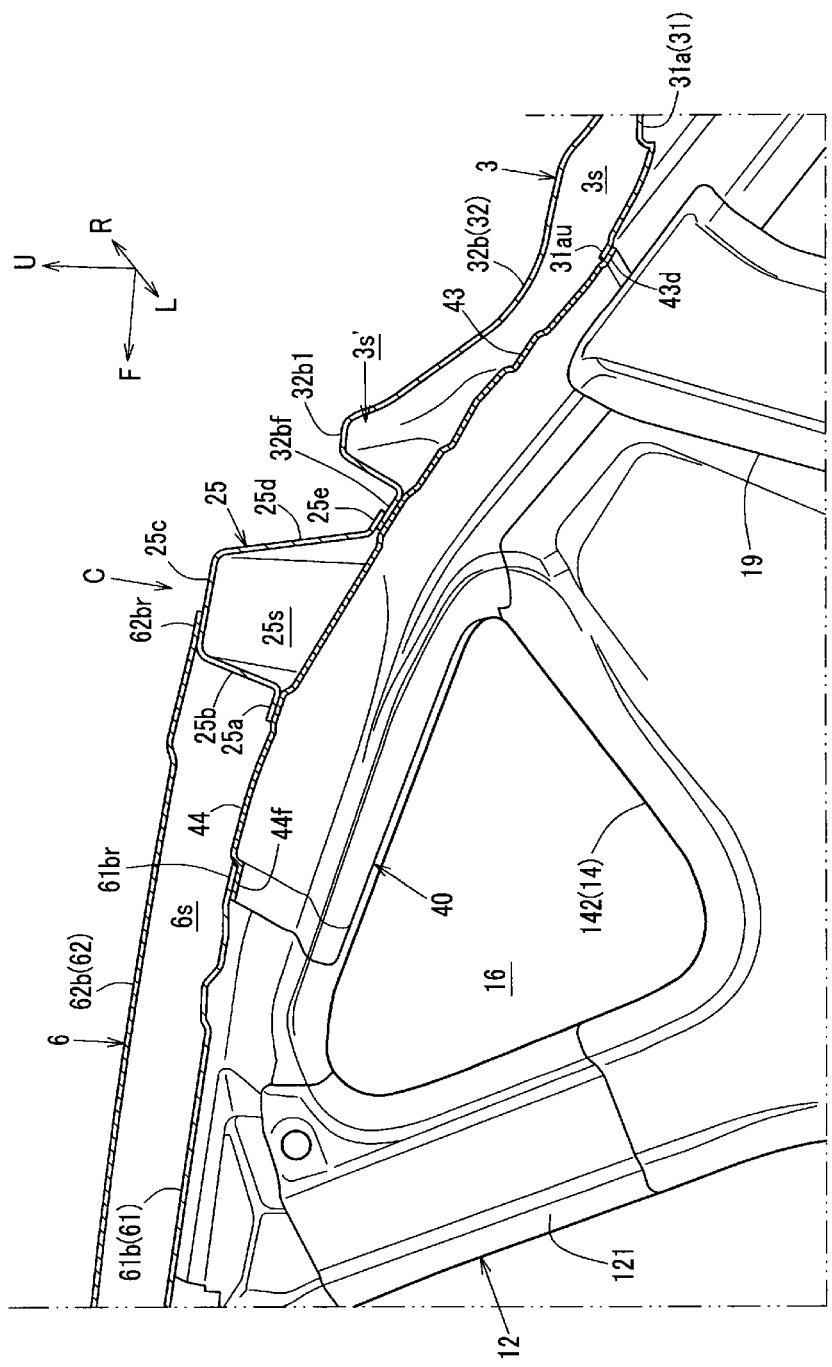
FIG. 6 is a perspective cross-sectional view in which the main section of the vehicle body rear structure is seen from below with respect to the arrow direction of C-C in FIG. 1.

FIG. 5 is a perspective cross-sectional view in which the main section of the vehicle body rear structure is seen from above and front with respect to an arrow direction of C-C in FIG. 1, and FIG. 6 is a perspective cross-sectional view in which the main section of the vehicle body rear structure is seen from below with respect to the arrow direction of C-C in FIG. 1.

As illustrated in FIG. 1 to FIG. 6, the above-described meeting section C includes a joint rein 25 and the reinforcing member 40.

As illustrated in FIG. 1, the joint rein 25 extends in the vehicle width direction in a manner to divide the meeting section C to front and rear sides at a substantially intermediate position in the vehicle longitudinal direction of the meeting section C. As illustrated in FIG. 5 and FIG. 6, the joint rein 25 includes a front edge flange 25a, a front wall 25b, an upper wall 25c, a rear wall 25d, and a rear edge flange 25e, and is integrally formed in a hat shape in which a cross section orthogonal to the vehicle longitudinal direction is opened downward.

In the joint rein 25, the front edge flange 25a and the rear edge flange 25e are disposed on an upper surface of the reinforcing member 40 (see FIG. 5 and FIG. 6). In this way, a closed cross section 25s that extends in the vehicle width direction is formed between the joint rein 25 and the reinforcing member 40 in the meeting section C.

In addition, as illustrated in FIG. 1, FIG. 5, and FIG. 6, in particular, FIG. 5 and FIG. 6, a rear end 62br of the roof side rail rein rear section 62b is joined to the upper wall 25c of the joint rein 25. Meanwhile, as illustrated in the same drawings, as described above, the rear edge flange 25e of the joint rein 25 is joined to the upper surface of the reinforcing member 40 via a front end flange 32bf of the rear pillar rein upper section 32b. In this way, the roof side rail 6 and the rear pillar 3 meet (are joined) via the joint rein 25.

In addition, as illustrated in FIG. 1, on the rear side of the joint rein 25 in the meeting section C, an upper end and an inner end in the vehicle width direction of the rear pillar rein upper section 32b is connected to an outer end in the vehicle width direction of the rear portion in the vehicle longitudinal direction (a portion substantially corresponding to a rear half in this example) of the rear header 2, that is, an outer end in the vehicle width direction of the hinge rein 23.

In this way, each of the raised sections 23a and 32b1 of the hinge rein 23 and the rear pillar rein upper section 32b is formed in a bead shape that extends continuously.

Figure 7:
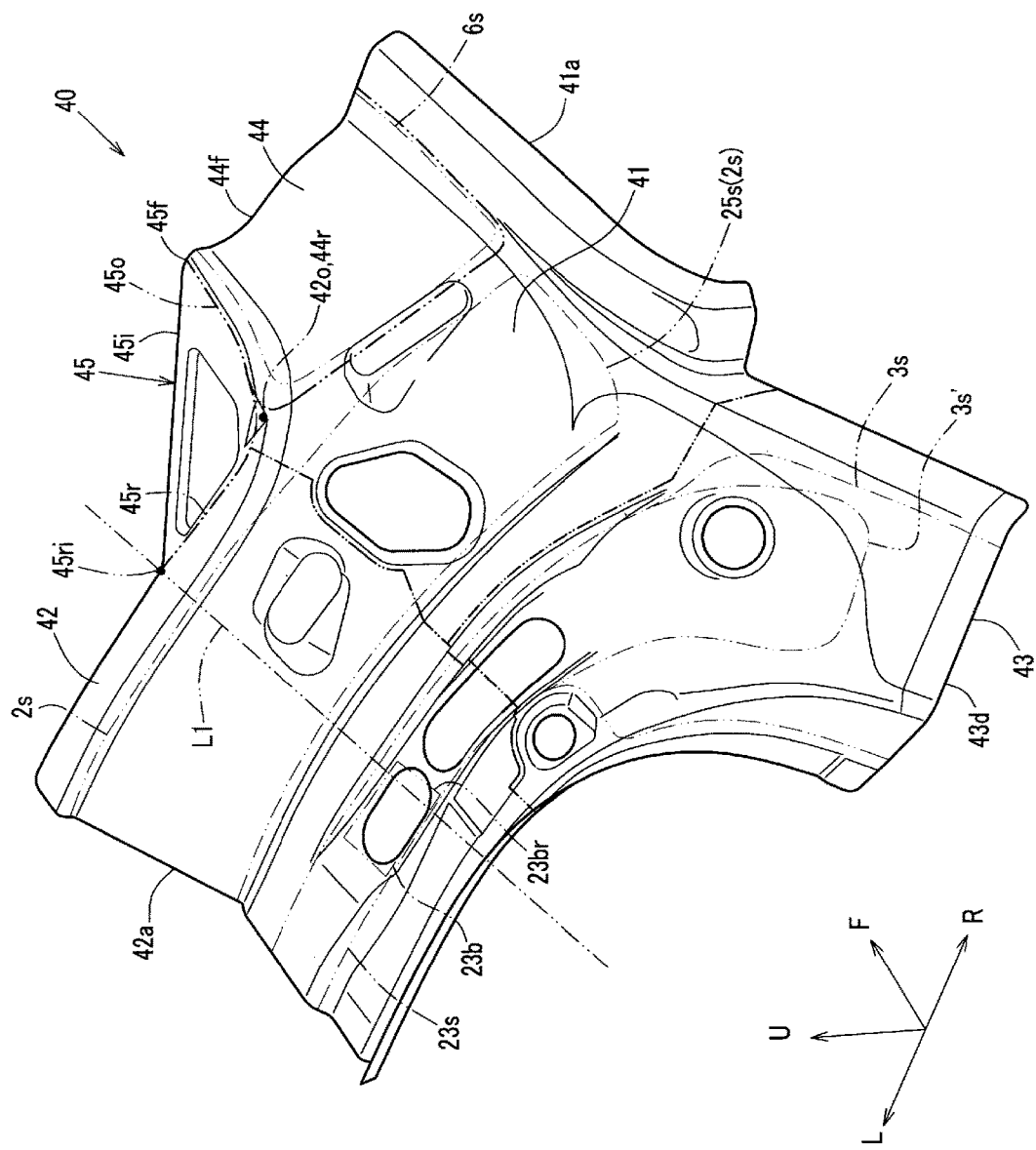
FIG. 7 is a perspective view in which a reinforcing member is seen from the rear and obliquely downward from the right.

FIG. 7 is a perspective view in which the reinforcing member 40 is seen from the rear and obliquely downward from the right.

As illustrated in FIG. 2 to FIG. 7, the reinforcing member 40 is mainly disposed below the rear header rein sides 22S, the hinge rein 23, the rear pillar rein upper section 32b, the roof side rail rein rear section 62b, and the like, is formed in a three-pronged shape that is branched from the meeting section C into each side of the rear header 2, the roof side rail 6, and the rear pillar 3 and that extends over base portions thereof (see FIG. 3, FIG. 4, and FIG. 7).

In detail, as illustrated in FIG. 7, in a vehicle plan view of the meeting section C, the reinforcing member 40 includes a main body section 41 that includes a portion corresponding to the joint rein 25, the header extension section 42, the pillar extension section 43, the rail extension section 44, and a relative displacement suppressing section 45, and is integrally formed by a single member.

Here, lines indicated by bold imaginary lines in FIG. 7 represent the adjacent extension sections and each boundary of the main body section 41. The reference sign 41a in FIG. 7 indicates an upper edge of the opening 16 for the quarter window (see FIG. 2 to FIG. 4), which is integrally formed as a part of the main body section 41.

As illustrated in FIG. 3, the header extension section 42 extends from the meeting section C to the outer portion in the vehicle width direction of the rear header 2. An inner end 42a in the vehicle width direction of the header extension section 42 is formed in a cross-sectional shape that is substantially the same as the cross section orthogonal to the vehicle width direction of the rear header inner 21, and is joined to an outer end 210 in the vehicle width direction of the rear header inner 21 by the spot welding or the like, so as to constitute a part of the rear header 2. In this way, the rear header inner 21 of the rear header 2 and the header extension sections 42 on both of the sides thereof extend continuously in the vehicle width direction.

Furthermore, as illustrated in FIG. 1 and FIG. 2, the rear header rein sides 22S and the hinge rein 23 are disposed on the front and rear sides of the header extension section 42 at positions above the header extension section 42. As illustrated in FIG. 2 and FIG. 4, the header extension section 42 is joined to the hinge rein 23 and the rear header rein sides 22S so as to form the closed cross sections 2s and 23s extending in the vehicle width direction with the hinge rein 23 and the rear header rein sides 22S. That is, on each of these sides of the rear header 2, the closed cross sections 2s and 23s (the front closed cross section 2s and the rear closed cross section 23s) extending in the vehicle width direction are disposed in two rows in a longitudinally adjacent manner (see FIG. 1 and FIG. 2).

Of the above-described closed cross sections 2s and 23s in the two rows that are disposed on each of the sides of the rear header 2, the front closed cross section 2s extends continuously in the vehicle width direction as a part of the closed cross section 2s of the rear header 2.

Here, as illustrated in FIG. 1, in the meeting section C, the above-described joint rein 25 is disposed in a portion corresponding to the rear header rein 22 in the vehicle longitudinal direction, and a vehicle-width inner end flange 25i of the joint rein 25 is joined to an outer edge 22o in the vehicle width direction of the rear header rein 22.

In addition, as illustrated in FIG. 1, the joint rein 25 is formed such that a height of the upper wall 25c is gradually reduced from an inner end to an outer end in the vehicle width direction. A vehicle-width outer end flange 25o of the joint rein 25 is joined to an upper end 142u of a rear inner panel upper such that the closed cross section 25s is closed from the outer side in the vehicle width direction. On the outer side in the vehicle width direction, the upper end 142u of the rear inner panel upper is adjacent to the meeting section C.

In this way, as illustrated in FIG. 1 and FIG. 7, of the above-described two closed cross sections 2s and 23s in the two rows that are disposed on each of the sides of the rear header 2, the front closed cross section 2s including the closed cross section 25s on the inside of the joint rein 25 continuously extends in the vehicle width direction from the rear header 2 to the meeting section C on both of the sides of the rear header 2.

In addition, as illustrated in FIG. 4, of the above-described closed cross sections 2s and 23s in the two rows that are disposed on both of the sides of the rear header 2, an inner end in the vehicle width direction of the rear closed cross section 23s is located inward in the vehicle width direction from at least the hinge fixing section 23b of the rear header 2, and extends along the vehicle width direction in parallel with the front closed cross section 2s.

As illustrated in FIG. 2, FIG. 5, and FIG. 6, the pillar extension section 43 extends from the meeting section C to the upper portion of the rear pillar 3, and a lower end 43d of the pillar extension section 43 forms a cross-sectional shape that is substantially the same as the cross section orthogonal to an extending direction of the rear pillar inner main section 31a. In addition, the pillar extension section 43 is joined to an upper end 31au of the rear pillar inner main section 31a by the spot welding or the like so as to constitute a part of the rear pillar 3.

Furthermore, inner and outer edges in the vehicle width direction of the pillar extension section 43 are joined to the rear pillar rein upper section 32b disposed above and, as illustrated in FIG. 5 and FIG. 6, these pillar extension section 43 and rear pillar rein upper section 32b form the closed cross section (3s) that extends in the longitudinal direction (and the up-down direction).

This closed cross section (3s) constitutes an upper portion (a front portion) of the closed cross section 3s that extends in the extending direction of the rear pillar 3, and continuously extends along the extending direction of the rear pillar 3 (see FIG. 5 and FIG. 6).

As illustrated in FIG. 1 and FIG. 5 to FIG. 7, an outer end in the vehicle width direction of the rear closed cross section 23s is continuously connected to the inner space 3s' of the raised section 32b1 that extends in the extending direction of the rear pillar 3 (more specifically, the space that is opened downward and is constructed as a part of the closed cross section 3s) (see FIG. 5 and FIG. 6). In addition, the rear closed cross section 23s extends and curves so as to gradually separate rearward from the front closed cross section 2s (in other words, such that the rear portion thereof is located outward in the vehicle width direction) in the meeting section C (see FIG. 1).

As illustrated in FIG. 2 to FIG. 6, the rail extension section 44 extends from the meeting section C to the rear portion of the roof side rail 6, and a front end 44f of the rail extension section 44 has a cross-sectional shape that is substantially the same as the cross section orthogonal to the vehicle longitudinal direction of a rear end 61br of the roof side rail inner rear section 61b and is joined to the rear end 61br of the roof side rail inner rear section 61b by the spot welding or the like so as to constitute a part of the roof side rail 6.

As illustrated in FIG. 1 to FIG. 4, inner and outer edges in the vehicle width direction of the rail extension section 44 are joined to the roof side rail rein rear section 62b disposed above, and these constitute the closed cross section (6s) that extends in the vehicle longitudinal direction (see FIG. 5 and FIG. 6).

This closed cross section (6s) constitutes a rear portion of the closed cross section 6s that extends in the extending direction of the roof side rail 6, and continuously extends along the extending direction of the roof side rail 6.

At a rear end, the closed cross section 6s is partitioned by the front closed cross section 2s (the closed cross section 25s of the joint rein 25) extending in the vehicle width direction and the front wall 25b of the joint rein 25 in the meeting section C.

As illustrated in FIG. 1 to FIG. 4 and FIG. 7, the relative displacement suppressing section 45 suppresses relative displacement between the header extension section and the rail extension section 44 and is integrally provided in a corner section (an inner corner section) of these extension sections 42 and 44, that is, in the meeting section C so as to be hung between these extension sections 42 and 44. That is, the reinforcing member 40 is integrally formed by the single member including the relative displacement suppressing section 45.

As illustrated in FIG. 7, a rear edge 45r of the relative displacement suppressing section 45 extends in the vehicle width direction along a front edge of the header extension section 42 and is formed inward in the vehicle width direction from a base end 42o (an outer end in the vehicle width direction) of the header extension section 42. Meanwhile, an outer edge 45o in the vehicle width direction of the relative displacement suppressing section 45 extends in the vehicle longitudinal direction along an inner edge in the vehicle width direction of the rail extension section 44 and is formed forward from a base end 44r (a rear end) side of the rail extension section 44.

Furthermore, an inner end 45i in the vehicle width direction of the relative displacement suppressing section 45 is formed to be inclined from the header extension section 42 to the rail extension section 44 in the vehicle plan view such that the inner end 45i is located outward in the vehicle width direction to the front.

From what have been described so far, the relative displacement suppressing section 45 is formed in a substantially triangular plane shape so as to tightly fill the corner section between the header extension section 42 and the rail extension section 44.

Moreover, as indicated by an imaginary line L1 in FIG. 7 that passes an inner end 45ri in the vehicle width direction and extends linearly in the vehicle longitudinal direction, an inner end 45ri in the vehicle width direction of the rear edge 45r of the relative displacement suppressing section 45 is formed inward in the vehicle width direction in comparison with an outer end 23*br* in the vehicle width direction of the hinge fixing section 23*b*. In this way, the header extension section 42 at least extends from the meeting section C to the hinge fixing section 23*b* in the vehicle width direction of the rear header 2.

As in this example, the header extension section 42 is preferably formed such that the inner end 45*ri* in the vehicle width direction thereof is located inward in the vehicle width direction in comparison with the outer end 23*br* in the vehicle width direction of the hinge fixing section 23*b* in the vehicle width direction of the rear header 2. However, the present disclosure is not limited thereto, and the header extension section 42 may be formed such that the inner end 45*ri* is formed close to the hinge fixing section 23*b*.

In addition, a front end 45*f* of an inner edge in the vehicle width direction of the relative displacement suppressing section 45 is formed at a position corresponding to the front end 44*f* of the rail extension section 44.

By the way, in a body assembly process for the rear body structure in this embodiment, for example, body rigid members such as the rear header 2, the rear pillar 3, and the roof side rail 6 are joined first, and then the outer panel and the like are assembled.

Thus, compared to a body assembly method in which the body is assembled to units such as a roof section and a floor section and then integrated therewith, it is possible to firmly join these body rigid members in the meeting section of the body rigid members.

In detail, in a conventional body assembly process, it is common to unitize and assemble the roof section and the like (as modules) and then assemble these units. For example, as a general manufacturing method, the roof section is assembled in advance as a roof unit, and then the rear header provided in the roof section is joined at plural points to the body side, that is, the rear pillar and the roof side rail in the meeting section by the spot welding or the like, so as to join the body rigid members.

However, in such a conventional body assembly process in which the body rigid members are joined later, for example, the outer panel such as the roof panel provided in the roof unit becomes bothersome when the rear header is joined to the rear pillar and the roof side rail in the meeting section by the spot welding or the like. As a result, it is concerned that positions and the number of welded points in the meeting section are limited, which is disadvantageous for firm joining.

Meanwhile, in the body assembly process for the rear body structure in this embodiment, as described above, in the meeting section C, for example, frames are assembled in advance by joining the rear header 2 to the rear pillar 3 and the roof side rail 6, and then the outer panel and the like are attached (that is, mounted later). Thus, the positions and the number of the welded points are not physically limited by interference of the outer panel and the like at the time of joining by the spot welding or the like. Therefore, it is possible to firmly join the body rigid members.

As described above, the vehicle rear body structure in this embodiment includes: the rear header 2 that extends in the vehicle width direction along the upper edge of the rear gate opening 1 opened rearward in the vehicle; and the roof side rail 6 that extends in the vehicle longitudinal direction in the body side portion, and, in the body rear portion, the meeting section C where the outer end in the vehicle width direction of the rear header 2 and the rear end of the roof side rail 6 meet is constructed (see FIG. 1 and FIG. 2). In the vehicle rear body structure, the reinforcing member 40 (see FIG. 2 to FIG. 4), which is integrally formed with the rail extension section 44 extending to the roof side rail 6 and the header extension section 42 extending to the rear header 2, is provided in the meeting section C. The plural closed cross sections 2*s* and 23*s*, each of which extends along the vehicle width direction, are formed adjacently in the vehicle longitudinal direction (in the cross section orthogonal to the vehicle width direction) between at least the header extension section 42 of the reinforcing member 40 and respective one of the rear header rein 22 and the hinge rein 23 as the rear header outers provided in the rear header 2 (see FIG. 1, FIG. 2, and FIG. 4). The relative displacement suppressing section 45, which suppresses the relative displacement between the rear header 2 and the roof side rail 6, is provided between the header extension section 42 and the rail extension section 44 (see FIG. 1, FIG. 2, FIG. 4, and FIG. 7).

According to the above configuration, the plural closed cross sections 2*s* and 23*s*, each of which extends along the vehicle width direction, are formed adjacently in the vehicle longitudinal direction between the reinforcing member 40 and respective one of the rear header rein 22 and the hinge rein 23 provided in the rear header 2. Thus, it is possible to reinforce the rear header 2, which is located above the rear gate opening 1, and for which the support rigidity for the rear gate (not illustrated) is requested.

Meanwhile, the reinforcing member 40 is integrally formed with the header extension section 42 and the rail extension section 44, and the relative displacement suppressing section 45 is provided between these extension sections 42 and 44. Thus, as described above, by reinforcing the rear header 2, it is possible to suppress the relative displacement between the rear header 2 and the roof side rail 6, occurrence of which by a rigidity difference between the rear header 2 and the roof side rail 6 is concerned.

In detail, as described above, in the case where the base portion (the outer portion in the vehicle width direction) of the rear header 2 with the roof side rail 6 is reinforced by forming the plural closed cross sections 2*s* and 23*s*, each of which extends in the vehicle width direction, adjacently in the vehicle longitudinal direction, and the like to strengthen the base portion, the base portion (the rear portion) of the roof side rail 6 with the rear header 2 becomes relatively weakened. As a result, it is concerned that the base portion (the outer portion in the vehicle width direction) of the rear header 2 moves relative to the base portion (the rear portion) of the roof side rail 6 by a load that is received by the rear header 2 from the rear gate and rocks the rear header 2 in the vehicle longitudinal direction.

To handle such a problem, in this embodiment, as described above, the reinforcing member 40 is integrally formed with the header extension section 42 and the rail extension section 44, and the relative displacement suppressing section 45 is provided between these extension sections 42 and 44. Thus, for example, by the relative displacement suppressing section 45, it is possible to effectively suppress a fluctuation in an angle defined by the rear header 2 and the roof side rail 6 in the meeting section C of the rear header 2 and the roof side rail 6.

As an aspect of the present disclosure, the relative displacement suppressing section 45 is hung between the rear header 2 and the roof side rail 6 in the meeting section C (the corner section) of these rear header 2 and roof side rail 6 (see FIG. 1 to FIG. 4 and FIG. 7), and the header extension section 42 extends from the meeting section C to at least the hinge fixing section 23*b* (the rear gate hinge fixing section) or a position nearby in the vehicle width direction of the rear header 2 (see FIG. 2, FIG. 4, and FIG. 7).

According to the above configuration, it is possible to improve a vibration suppression effect of the body rear portion against the displacement of the rear gate during travel of the vehicle.

In detail, according to the above configuration, the closed cross section 23s can be formed between at least the hinge fixing section 23b or the portion nearby and the header extension section 42 in the vehicle width direction of the rear header 2. Thus, it is possible to reinforce the hinge fixing section 23b (the hinge rein 23) where the rear gate hinge (not illustrated) is fixed. That is, it is possible to increase the support rigidity of the rear header 2 for the rear gate.

Furthermore, the header extension section 42 is provided from the meeting section C to at least the hinge fixing section 23b or the position nearby in the vehicle width direction of the rear header 2. In this way, it is possible to efficiently transmit the load, which is received by the hinge fixing section 23b from the rear gate via the rear gate hinge during the travel of the vehicle, from the hinge fixing section 23b to the meeting section C via the closed cross section 23s formed between the header extension section 42 and the hinge rein 23 and to disperse such a load to the roof side rail 6.

Moreover, since the relative displacement suppressing section 45 is hung between the rear header 2 and the roof side rail 6 in the meeting section C of these rear header 2 and roof side rail 6, it is possible to form a route through which the load, which is received by the hinge fixing section 23b from the rear gate, is transmitted to the roof side rail via the relative displacement suppressing section 45 without interposing the meeting section C. Thus, it is possible to improve load dispersion efficiency to the roof side rail 6.

Thus, by suppressing the relative displacement between the rear header 2 and the roof side rail 6 caused by the rigidity difference, it is possible to improve the vibration suppression effect against the displacement of the rear gate during the travel of the vehicle.

As the aspect of the present disclosure, the rear pillar 3, which extends along the side edge of the rear gate opening 1, meets the meeting section C (see FIG. 1 to FIG. 4), the reinforcing member 40 is integrally formed with the pillar extension section 43, which extends from the meeting section C to the rear pillar 3 (see FIG. 2 to FIG. 7), and the closed cross section 3s, which extends along the side edge of the rear gate opening 1, is formed between the rear pillar rein 32 (particularly, the rear pillar rein upper section 32b) as the rear pillar outer provided in the rear pillar 3 and at least the pillar extension section 43 of the reinforcing member 40 (see FIG. 2, FIG. 5, and FIG. 6).

According to the above configuration, the meeting section C, which is located at the upper corner of the rear gate opening 1, is reinforced by the reinforcing member 40, which is integrally formed with the pillar extension section 43 and the rail extension section 44 and forms the closed cross sections 2s, 23s, 3s, and 6s with the outer panels (the rear header rein 22, the hinge rein 23, the rear pillar rein 32, and the roof side rail rein 62) of the rear header 2, the rear pillar 3, and the roof side rail 6. In this way, it is possible to further improve the vibration suppression effect of the body rear portion against the displacement of the rear gate during the travel of the vehicle.

The present disclosure is not limited to the configuration in the above-described embodiment, but can be implemented in various embodiments.

The invention claimed is:

1. A vehicle rear body structure including:
a rear header that extends in a vehicle width direction along an upper edge of a rear gate opening opened rearward in a vehicle;
a roof side rail that extends in a vehicle longitudinal direction in a body side portion;
a reinforcing member provided at a meeting position where an outer end in the vehicle width direction of the rear header and a rear end of the roof side rail meet in a body rear portion, wherein the reinforcing member is integrally formed with a rail extension portion that extends to the roof side rail and a header extension portion that extends to the rear header;
plural closed cross sections that each extend along the vehicle width direction and are formed adjacently in the vehicle longitudinal direction between a rear header outer provided in the rear header and at least the header extension portion of the reinforcing member; and
a relative displacement suppressing portion provided between the rail extension portion and the header extension portion, wherein the relative displacement suppressing portion is configured to suppress relative displacement between the rear header and the roof side rail.

2. The vehicle rear body structure of claim 1, wherein
in the meeting position, the relative displacement suppressing portion is disposed between the rear header and roof side rail.

3. The vehicle rear body structure of claim 1, wherein
the header extension portion extends from the meeting position to a position where a rear gate hinge is attached in the vehicle width direction of the rear header.

4. The vehicle rear body structure of claim 1, wherein
the header extension portion extends from the meeting position to a position in close proximity to a position where a rear gate hinge is attached in the vehicle width direction of the rear header.

5. The vehicle rear body structure of claim 1, further comprising:
a rear pillar that extends along a side edge of the rear gate opening adjoins the meeting position.

6. The vehicle rear body structure of claim 5, wherein
the reinforcing member is integrally formed with a pillar extension portion that extends from the meeting position to the rear pillar.

7. The vehicle rear body structure of claim 6, further comprising:
a closed cross section that extends along the side edge of the rear gate opening and is formed between a rear pillar outer provided in the rear pillar and at least the pillar extension portion of the reinforcing member.

8. The vehicle rear body structure of claim 1, wherein
the reinforcing member is integrally formed by a single member including the relative displacement suppressing portion.

9. The vehicle rear body structure of claim 1, wherein
a rear edge of the relative displacement suppressing portion extends in the vehicle width direction along a front edge of the header extension portion and is formed inward in the vehicle width direction from a base end of the header extension portion.

10. The vehicle rear body structure of claim 1, wherein
an outer edge in the vehicle width direction of the relative displacement suppressing portion extends in the vehicle longitudinal direction along an inner edge in the vehicle width direction of the rail extension portion and is formed forward from a base end side of the rail extension portion.

11. The vehicle rear body structure of claim 1, wherein
an inner end in the vehicle width direction of the relative displacement suppressing portion is formed to be inclined from the header extension portion to the rail extension portion in the vehicle plan view such that the inner end is located outward in the vehicle width direction to the front.

12. The vehicle rear body structure of claim 1, wherein
the relative displacement suppressing portion is formed in a substantially triangular plane shape so as to fill a corner between the header extension portion and the rail extension portion.

13. The vehicle rear body structure of claim 1, wherein
an inner end in the vehicle width direction of the header extension portion is located inward in the vehicle width direction in comparison with an outer end in the vehicle width direction of a position where a rear gate hinge is attached in the vehicle width direction of the rear header.

14. The vehicle rear body structure of claim 1,
a front end of an inner edge in the vehicle width direction of the relative displacement suppressing portion is formed at a position corresponding to a front end of the rail extension portion.

15. A vehicle comprising:
a rear body structure including
a rear header that extends in a vehicle width direction along an upper edge of a rear gate opening opened rearward in a vehicle;
a roof side rail that extends in a vehicle longitudinal direction in a body side portion;
a reinforcing member provided at a meeting position where an outer end in the vehicle width direction of the rear header and a rear end of the roof side rail meet in a body rear portion, wherein the reinforcing member is integrally formed with a rail extension portion that extends to the roof side rail and a header extension portion that extends to the rear header;
plural closed cross sections that each extend along the vehicle width direction and are formed adjacently in the vehicle longitudinal direction between a rear header outer provided in the rear header and at least the header extension portion of the reinforcing member; and
a relative displacement suppressing portion provided between the rail extension portion and the header extension portion, wherein the relative displacement suppressing portion is configured to suppress relative displacement between the rear header and the roof side rail.

16. The vehicle of claim 15, wherein
in the meeting position, the relative displacement suppressing portion is disposed between the rear header and roof side rail.

17. The vehicle of claim 16, wherein
the header extension portion extends from the meeting position to a position where a rear gate hinge is attached in the vehicle width direction of the rear header.

18. The vehicle of claim 16, wherein
the header extension portion extends from the meeting position to a position in close proximity to a position where a rear gate hinge is attached in the vehicle width direction of the rear header.

19. The vehicle of claim 15, further comprising:
a rear pillar that extends along a side edge of the rear gate opening adjoins the meeting position.

20. A vehicle rear body structure including:
a rear header that extends in a vehicle width direction along an upper edge of a rear gate opening opened rearward in a vehicle;
a roof side rail that extends in a vehicle longitudinal direction in a body side portion;
a reinforcing means provided at a meeting position where an outer end in the vehicle width direction of the rear header and a rear end of the roof side rail meet in a body rear portion, wherein the reinforcing means is integrally formed with a rail extension section that extends to the roof side rail and a header extension section that extends to the rear header;
plural closed cross sections that each extend along the vehicle width direction and are formed adjacently in the vehicle longitudinal direction between a rear header outer provided in the rear header and at least the header extension section of the reinforcing member means; and
a relative displacement suppressing means provided between the rail extension section and the header extension section, wherein the relative displacement suppressing means suppresses relative displacement between the rear header and the roof side rail.

* * * * *